Figure 1:
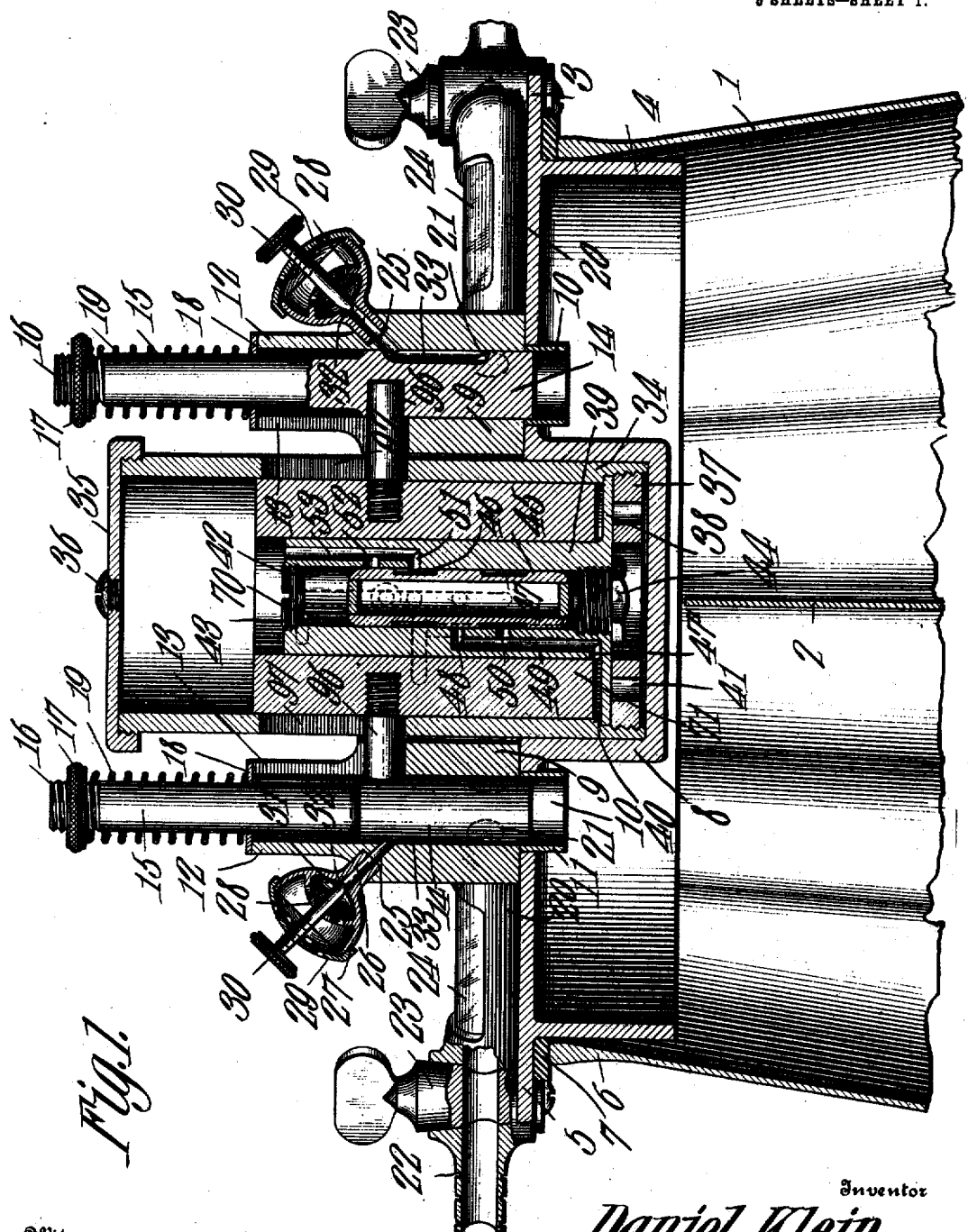

D. KLEIN.
MILKING MACHINE.
APPLICATION FILED FEB. 27, 1908.

924,997.

Patented June 15, 1909.
5 SHEETS—SHEET 1.

Witnesses
E. F. Stewart
F. T. Chapman

Inventor
Daniel Klein,
By C. A. Snow & Co.
Attorneys

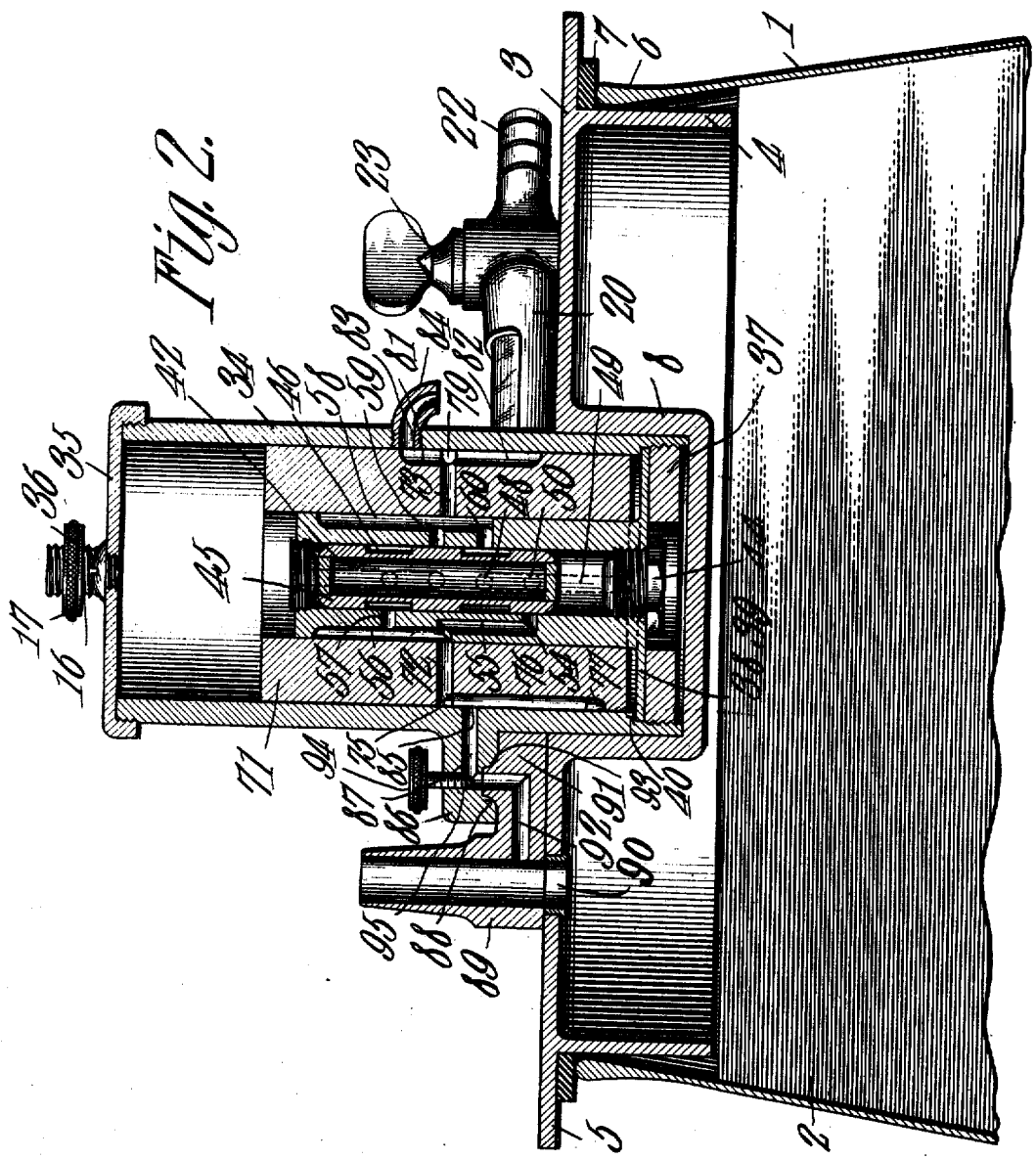

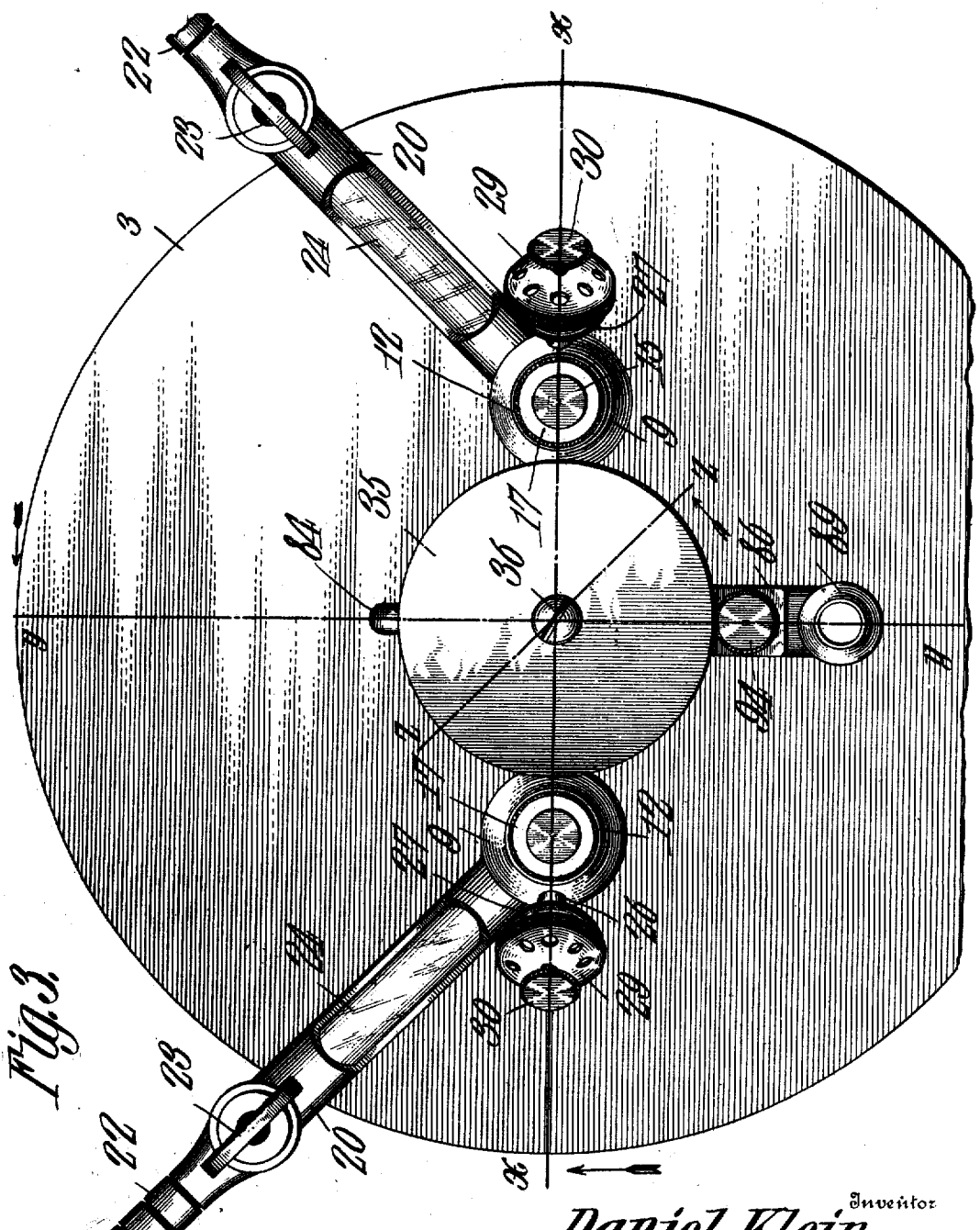

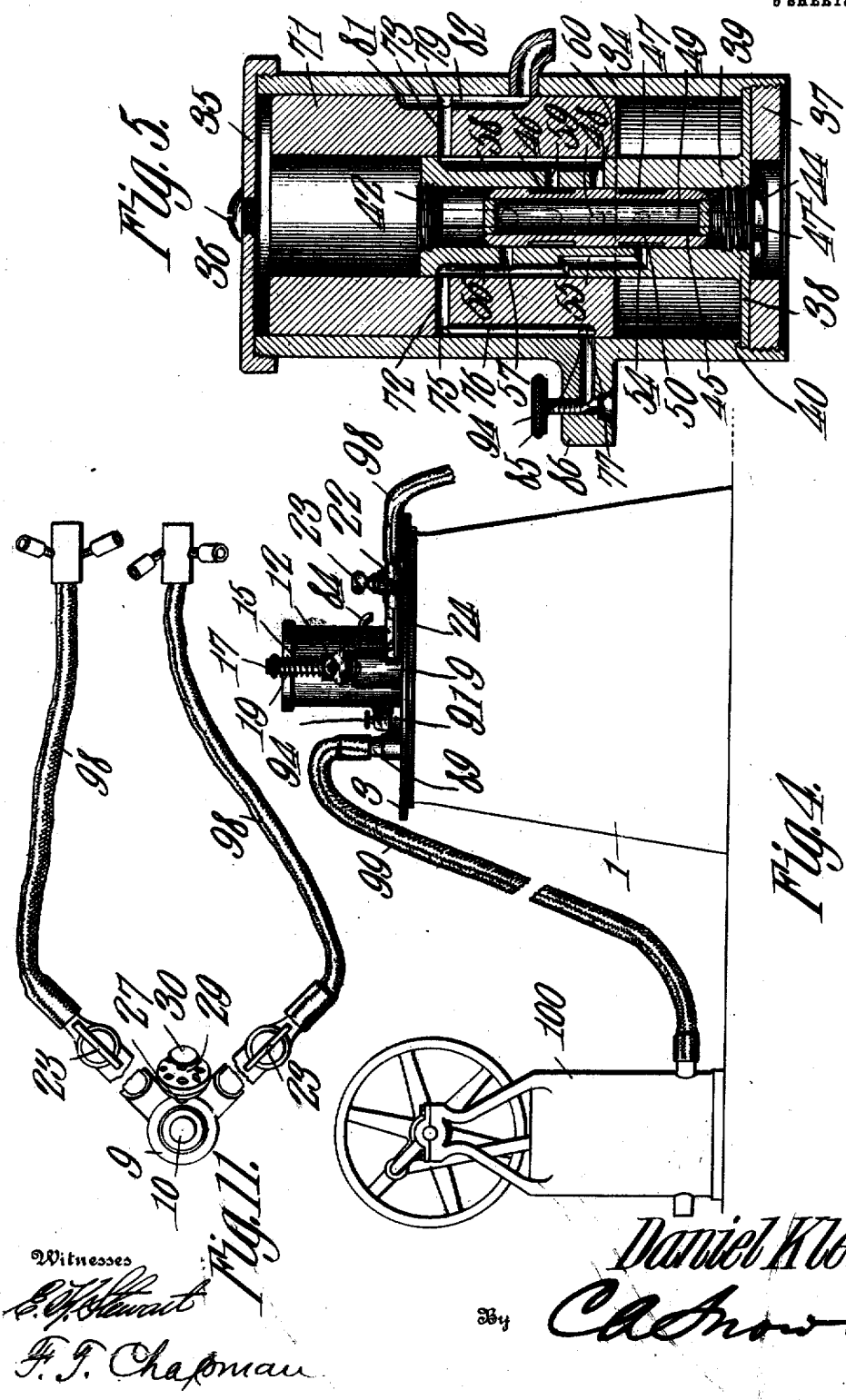

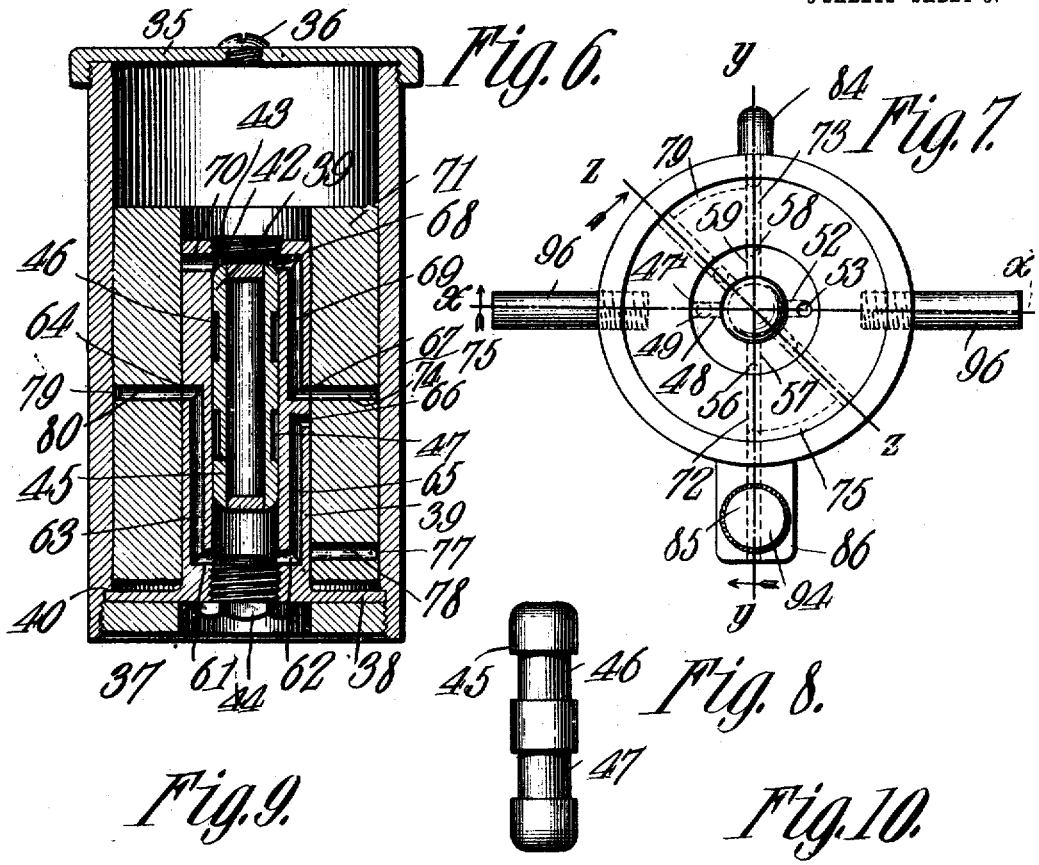
D. KLEIN.
MILKING MACHINE.
APPLICATION FILED FEB. 27, 1908.
924,997.
Patented June 15, 1909.
5 SHEETS—SHEET 5.
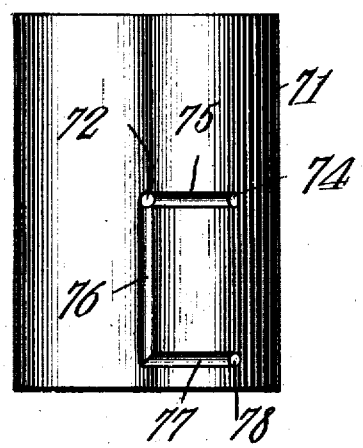
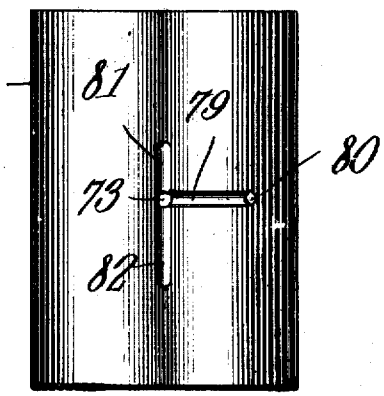
Witnesses
Inventor
Daniel Klein,
By C. A. Snow & Co
Attorneys

UNITED STATES PATENT OFFICE.

DANIEL KLEIN, OF SPOKANE, WASHINGTON.

MILKING-MACHINE.

No. 924,997.  Specification of Letters Patent.  Patented June 15, 1909.

Application filed February 27, 1908. Serial No. 418,083.

*To all whom it may concern:*

Be it known that I, DANIEL KLEIN, a citizen of the United States, residing at Spokane, in the county of Spokane and State of Washington, have invented a new and useful Milking-Machine, of which the following is a specification.

This invention has reference to improvements in milking machines, and one of the objects is to produce a machine of the pulsator type wherein the engine for producing the pulsating action is readily and entirely removable from those parts of the device which are reached by the milk and, therefore, need proper sterilizing so that those parts of the machine which would be harmed by the operation of sterilizing need not be subjected to such treatment. This is a particularly valuable feature of the present invention since sterilizing is not in any manner interfered with because those parts of the apparatus which might be harmed by the treatment necessary for thorough sterilization are removable without the necessity of unfastening any parts since the removable parts may be readily lifted out of place or again placed into the machine without any special fastening devices of any kind.

Another important feature of the invention comprises a means whereby the influx of air to break the suction between the cow and the milk pail is rendered adjustable so that it may be regulated in accordance with the speed of the pulsator. Some cows milk very freely while others are hard milkers, and consequently the speed of the pulsator engine may be fast for the easy milking cows but must be slow for the hard milking cows. If it were not for the fact that the air influx port could be opened or throttled at will too much air would enter when the engine was running slow and there would be danger of the teat cups dropping off because of the equalization of pressure. For this reason when a hard milking cow is encountered the engine is run at a much slower speed and the air inlet port is correspondingly throttled so as to always maintain sufficient difference of pressure to hold the teat cups in place.

By the present invention there is a pneumatic engine employed, and this is actuated by normal air pressure, the vacuum used to cause the milking operation being utilized for the driving of the engine to produce the pulsating effect. By thus utilizing ordinary atmospheric pressure an extra air pipe and air compressing means is avoided, and since the engine has to perform but little work normal atmospheric pressure is adequate.

The engine forming part of the present invention is so designed that the more delicate working parts are completely inclosed out of the reach of the unskilled operators, such as are usually employed about dairy farms. The construction of the engine is such that the air used to operate the engine does not enter the milk pail and so will not contaminate the milk. By this means the milk from the time it leaves the cow until it reaches the pail, and while in the pail, is not liable to air contamination. Therefore, this particular as well as the facility with which the apparatus may be sterilized renders the machine as a whole highly sanitary.

The invention, as above outlined, together with other features thereof, will be best understood from a detail description taken in connection with the accompanying drawings forming a part of this specification, in which drawings,—

Figure 1 is a central vertical section through the apparatus applied to a milk pail, the structure being of the double pulsator type. Fig. 2 is a similar section at right angles to that shown in Fig. 1. Fig. 3 is a plan view of the structure shown in Figs. 1 and 2. Fig. 4 is an elevation of the structure showing the connection to an air exhaust mechanism. Fig. 5 is a section through the pneumatic engine detached from the rest of the apparatus, the section being in the same plane as Fig. 2, but showing a different phase of operation. Fig. 6 is a section of the pneumatic engine, detached, on a different plane than shown in Figs. 1 and 2, and illustrating still another phase in the operation of the engine. Fig. 7 is a plan view of the pneumatic engine detached, with the sectional planes of certain of the preceding figures indicated, the section line $x$—$x$ indicating the sectional plane of Fig. 1, the section $y$—$y$ indicating the sectional plane of Figs. 2 and 5, and the section line $z$—$z$ indicating the sectional plane of Fig. 6. Fig. 8 is an elevation of the oscillating valve, detached. Figs. 9 and 10 are elevations of the pistons, detached, and illustrating the ports and connecting grooves between them. Fig. 11 is a plan view illustrating the adaptation of the mechanism for a single pulsator structure.

In the drawings, the views are principally directed to a structure comprising a double pulsator mechanism, but it is to be understood that by a slight modification a single pulsator may be used in connection with two or more leads terminating in teat cups.

Referring to the drawings, there is shown a milk pail 1 which may be of any suitable shape, and where it is desirable to separate the milk coming from different cows the pail may be provided with a dividing partition 2, and in this case a double pulsator structure will be used so that the milk from each cow may be separately delivered into an appropriate compartment in the pail. For the purpose of adapting the device to more than two cows at one time an appropriate number of pulsators may be used, and should it be desired to separate the milk of each individual cow from that of the others, then the pail will be divided into the desired number of compartments by a suitable number of partitions 2.

In the following description it is considered that each pail will be provided with a pulsator apparatus adapted to two cows only with the understanding, however, that this is in a measure indicative only and more than two cows may be milked at the same time by the same apparatus by a simple multiplication of parts.

Fitted to the pail is a cover 3 provided with a downwardly-extended annular flange 4 fitting closely into the mouth of the pail. Beyond the flange 4 the cover is formed into an annular ledge 5 and between this ledge and the rim 6 of the pail is interposed a packing ring 7 which may be, if desired, an ordinary rubber packing ring such as is commonly used. The center of the cover 3 is depressed to form a cylindrical cup 8 for a purpose which will presently appear. On each side of the cup 8, the cover has fast thereon an upright cylinder 9 communicating with the inside of the pail through an opening 10 which receives a short tubular extension 11, the inner walls of which constitute a continuation of the cylinder 9.

The upper end 12 of the cylinder 9 is externally contracted in diameter, and through this contracted portion or neck 12 and down into the body of the cylinder there is formed a longitudinal slot 13 opening at the upper end of the neck 12. Within each cylinder 9 is a piston or plunger 14 closely fitting the thicker portion of the cylinder and reduced into a stem 15 above the closely fitting portion, which stem is continued above the upper end of the neck 12 for a distance and at its extreme upper end is provided with screw-threads 16 receiving a thumb nut 17. Surrounding the stem 15 between the nut 17 and a washer 18 resting on the upper end of the neck 12 is a helical spring 19, the tension of which may be adjusted by appropriately turning the nut 17. Near the lower end, each piston 9 communicates with a conduit 20 on the top of the cover 3 through a port 21, and this conduit 20 terminates in a suitable hose-receiving nipple 22 beyond the edge of the cover 1, and interposed in the length of the conduit 20 is a valve 23. The upper face of the conduit is cut away for an appropriate distance and receives a transparent section 24 whereby the contents of the conduit may be examined at any time. Each cylinder 9 at a point about coincident with the junction of the neck 12 thereto, is provided with a passage 25 leading from the external air to the interior of the cylinder, and this passage receives the neck 26 of a cup 27 in which is formed or into which is inserted a perforated diaphragm 28. The outer end of the cup is provided with a perforated cover 29 which may be screwed thereon, and this cover has a central threaded passage for a thumb screw 30, the lower end of which is formed into a needle valve 31 capable of entering the passage 25 and seating on the valve seat 32 formed at the mouth of said passage where it enters the cup 27. Each piston 14 has formed in one face a longitudinal groove 33 of such length as to reach from the passage 25 to the port 21 without entirely including the latter.

Fitted to the cup 8, so as to seat snugly therein but at the same time be freely removable therefrom is a cylinder 34 closed at the upper end by a screw cap 35 having a central threaded opening for the reception of a screw plug 36. The lower end of the cylinder 34 is closed by a screw ring 37 confining the bottom annular flange 38 of a hollow post 39 to a shoulder 40 formed by counterboring the lower end of the cylinder 34. This ring is provided with perforations 41 suitably spaced for the application of a spanner, by means of which the ring is screwed into place. The post 39 has its central bore 42 closed at the upper end by a screw-plug 43 and at the lower end by a screw plug 44, and within the bore 42 of the post and snugly fitting the same is confined an elongated cylindrical oscillating valve 45 having between its ends two spaced annular grooves 46 and 47. The post 39 has formed in it a number of connected ports. In Fig. 1, the post is shown formed with a port 47' near its lower end opening outward, and another port 48 about midway of its length opening inward, and these two ports are connected by a passage 49. Below the port 48 the passage 49 communicates with another inwardly opening port 50. At a point diametrically opposite the port 48 but higher up on the post is another inwardly-opening port 51, and at a short distance above this last-named port is still another inwardly opening port 52, and these two ports are connected by a passage 53 continuing to and opening at the upper end of the post. At about the same elevation as the port 50 but at right angles thereto, the post has another inwardly opening port 54 connected by a passage 55 to an elongated outwardly-opening port 56 in the form of a longitudinal groove extending from a point slightly above the middle of the post to near its upper end. The port 56 is also in communication with the interior of the post by another port 57 at about the same level as, but at right angles to, the port 52, before referred to. Diametrically opposed to the elongated port or groove 56 is another outwardly-opening port or groove 58, communicating with the interior of the post by a port 59 on about the same level as, but at right angles to the port 51, and this groove 58 is of sufficient length to communicate with the interior of the post by another port 60 at right angles but on about the same level as the port 48. Near the bottom of the post 39 are two other inwardly-opening ports 61 and 62 diametrically opposed to each other, the port 61 being connected by a passage 63 to an outwardly-opening port 64 about coincident with the lower end of the port or groove 56, while the port 62 is connected by a passage 65 with an outwardly-opening port 66 about on a level with the port 60 before referred to. Directly above the port 66 is another outwardly-opening port 67 connected to an inwardly-opening port 68 near the upper end of the post by a passage 69, while opposite the port 68 the post has a through port 70.

Surrounding and guided by the post 39 is an annular piston 71 somewhat longer than the post, and this piston is provided with a system of ports adapted to match the ports in the post in the different phases of the movement of the said piston. The piston ports are best shown in Figs. 9 and 10, which are views from opposite sides of the piston. About midway of the length of the piston is a radial through port 72, and diametrically opposite this port is another through radial port 73. The port 72 is connected to another radial through port 74 by an exterior groove 75, the ports 72 and 74 being separated about 45°, as indicated in the drawings. The port 72 is in communication with a longitudinal groove 76 extending downward to nearly the bottom of the piston where it meets a lateral groove 77, finally merging into a radial port 78 separated from the groove 76 by about 45° and located immediately under the port 74. The port 73 is connected by a horizontal groove 79 with another radial port 80 about 45° away from the port 73, and the port 73 also communicates with another vertical groove having a comparatively short branch 81 above the port 73, and a longer branch 82 below the same.

The cylinder 34 is provided with an air inlet port 83 communicating with a short inlet pipe 84 which may be downwardly directed exterior to the cylinder to prevent the accumulation of dust or dirt therein. The inlet port 83 is so located as to communicate with the upper end of the groove 81, when the piston is in its lowermost position. On the other side of the cylinder from the air inlet port 83 is another port 85 leading into a neck 86, and the port 85 is in communication through a conduit 87 with a short downwardly-directed branch opening into a recess 88 formed on the under side of the neck 86.

Fast on the cover 3 is a hose-receiving nipple 89, the bore of which is in communication with the inside of the pail through a bushing 90 seated in a perforation in the cover 3. The nipple 89 has a lateral branch 91 in which is formed a conduit 92 leading into a boss 93 formed on the continuation 91 and adapted to enter the recess 88 in the neck 86. The neck 86 carries a thumb screw 94 having its lower end formed into a needle valve 95 adapted to enter and throttle or even close the passage 87.

The piston 71 carries at diametrically-opposite points two screw pins 96 passing through longitudinal slots 97 in the cylinder 34 and entering suitable recesses in the pistons 14, the said pins extending also through the slots 13.

The nipples 22 receive suitable flexible conduits or hose 98, at the free ends of which are carried teat cups of any suitable construction for the purpose. The nipple 89 receives a conduit or hose 99 which may lead to a suitable air exhaust pump 100, as shown in Fig. 4. The showing, however, of this figure is to be taken as illustrative only since the hose 89 may lead to any suitable exhaust mechanism, and a single exhaust mechanism may be used for any number of pulsator devices instead of using an air exhaust pump for each separate device. The purpose of the exhaust pump is primarily to create a vacuum within the pail 1 and the effect of this vacuum is utilized for the milking operation.

Let it be assumed that the teat cups are properly applied and that a vacuum exists in the pail 1 and also that the valves 23, either or both, have been turned to the open position. The piston 71 and oscillating valve 45 are both supposed to be in the lowermost position. There is now established between the port 85 connected to the vacuum side of the apparatus and the port 83 connected to the air, a pressure difference depending upon the degree of vacuum maintained within the pail, and this difference may approach fifteen pounds to the square inch.

When the valve 45 is in the lowermost position and the piston 71 is also in the lowermost position there is established communication between the exhaust side of the device through the conduits 92 and 87, port 85, conduit 76, lateral groove or conduit 75 and port 74, thence by port 67, conduit 69, and port 68 to the space above the oscillating valve. The pressure above the valve being reduced the said valve immediately rises to the position shown in Fig. 2. This brings the groove 46 into coincidence with the port 52, and, therefore, there is established communication, through port 72 and ports 56 and 57 between the exhaust side of the device and the space above the piston 71 through the passage 53. At the same time there is established communication between the air inlet port 83, groove 81, port 73, groove 58, port 60, groove 47 in the oscillating valve, port 48, passageway 49 and port 47' to the under side of the piston. Under these circumstances, normal air pressure is established beneath the piston 71 and reduced air pressure depending upon the degree of vacuum is produced above said piston and the latter is moved upward, carrying with it the two pulsator pistons 14. The upward movement of the piston 71 ultimately brings it into the position shown in Fig. 5. Now, there is established communication between the air side through the port 80 and port 70 and the upper side of the oscillating valve 45, while the exhaust side of the apparatus is put in communication by the ports 76 and 77 to the lower side of the oscillating valve 45 through the passage 65 and port 62. The valve 45 immediately drops and there are now air passages established as follows: from the port 83 through the groove 82 to the port 73, thence by the groove 58 and port 59 to the groove 46, and from thence by the port 51 through the channel 53 to the space above the piston, while the space below the piston is put into communication with the exhaust side of the apparatus through the channel 76, port 72, elongated port 56, channel 55, port 54, to the groove 47, thence by port 50, channel 49 and port 47'. The superior air pressure on top of the piston immediately forces the same to the lowermost position when the cycle of operations is repeated automatically and continuously so long as the air is exhausted from the nipple 89.

While the nipple 89 is in free communication with the interior of the pail, it is to be observed that the air utilized for the operation of the engine does not pass into the pail at all, and so the milk deposited in the pail cannot become contaminated by contact with the air utilized for running the engine. Furthermore, there being no intercommunication between the engine and the pulsators, the engine may be lubricated by oil or other lubricant introduced through the opening normally closed by the plug 36. It will be understood of course that whenever needed suitable packing will be employed, although such packing is not shown in the drawings, except between the cover 3 and the mouth of the pail 1.

The reciprocatory movement of the piston 71 causes a like reciprocatory movement of the pulsator pistons 14, and when the pistons 14 are in their lowermost position, which is determined by the length of the slots 13 and 97, then the passage 25 in each cylinder 9 and the port 21 through each cylinder 9 are in communication through the groove 13. When the piston 71 has risen a short distance communication between the groove 33 and the port 21 is cut off, and immediately after this the continued upward movement of the piston 71 uncovers the port 21 to the interior of the pail through the sleeve 11. Now, the vacuum or partial vacuum within the pail 1 acts to extract the milk from the cow, and this milk will flow through the conduit 20 past the transparent inspection section 24 and find its way through the port 21 into the pail 1. When the piston 71 again descends, the piston 14 of each pulsator first closes the port 21 and then places the latter in communication with the atmosphere through the passage 25 and cup 27, thus breaking the vacuum in the conduit 20. However, this vacuum must not be entirely destroyed for otherwise the teat cups would fall off, so provision is made whereby the vacuum though much reduced is still maintained to a partial extent sufficient to hold the teat cups in place, and when the higher vacuum in the pail again becomes effective, these teat cups are thereby caused to act in the proper manner.

The adjustable valves 31 in the air inlet ports or passages 25 for breaking the vacuum enable the operator to adjust the machine for rapid or slow work in accordance with the animal to be milked since some cows give milk freely and the machine may be run at high speed, and other cows are hard milkers, necessitating the running of the machine at a slow speed. Were the air ports for breaking the vacuum simple unrestricted air ports, then if the ports were made of such size as to operate properly when the machine is run at a high speed, they would permit the introduction of too great a quantity of air when the machine was run at low speed, thus permitting the teat cups to fall off because the vacuum would be very nearly or quite destroyed. When the machine is run slowly it is only necessary to throttle the air ports 25 by means of the valves 31 to the extent necessary to prevent a too great reduction of the vacuum.

It has been found in practice that in spite of the fact that there is an inrush of air through the ports 25 when the ports 21 are put into communication with them there also occurs a rebound, causing the outflow of some milk through the ports 25. In order to prevent this the cups 27 each with the perforated diaphragm 28 are employed so that the outflow of milk is prevented, and these cups have been found in practice to prevent such outflow of milk through the air ports 25.

The springs 19 on each pulsator serve to hold the pulsator piston 14 normally with its lower end above the port 21 for without these springs the air pressure on the upper ends of the pistons 14 would tend to force the pistons 14 below the ports 21 and thus open the air ports and cause the teat cups to fall off. In the operation of the machine, therefore, the normal position of the pistons 14 and 71 is higher than that shown in Fig. 1, in which latter figure the parts are shown in one phase of the operation but not in the normal position. The lowermost position of the parts is effected against the action of the springs 19, and the piston 71 is immediately assisted in its upward movement by the reaction of the springs 19, the tension of which latter is sufficient to overcome the weight of the parts and the air pressure exerted on the said pistons 14. When but one cow is to be milked by the apparatus then one of the valves 23 is closed and the other is allowed to remain open, and the corresponding pulsator will be active to the conduit in which the valve 23 is open. When it is desired to separate the milk of two or more cows, then pails provided with partitions 2 are employed so that each pulsator will deliver the milk into a corresponding compartment. When it is not found necessary to separate the milk there may be provided milking machines in which but one pulsator is used for two or more conduits 20, and this is indicated in Fig. 11, and such a machine may be used for milking one or more cows depending on the number of conduits 20, but in such instance the milk is not separated but becomes mixed in the pail or receptacle.

The speed of the pneumatic engine is readily regulated by means of the valve 95 carried by the screw 94, so that the passage 87 may be throttled to a greater or less extent, depending upon the desired speed, and this may be done without affecting the degree of vacuum maintained in the pail 1.

Let it be assumed that the apparatus has been used to the desired extent and that it is to be cleansed before being laid away for future use. This cleansing of course should be done after each milking, for otherwise the machine is liable to become an active source of toxic contamination, or a producer of ferments which will quickly destroy the keeping qualities of milk. The failure to properly clean milking machines is usually due to the fact that the parts are not easily separable or removable, and hence the proper cleansing is not performed by the attendants. Moreover, the proper sterilization of the milk-carrying parts is either very difficult or practically impossible in many milking machines, for the reason that the operating parts of the machine cannot be readily separated from the milk-carrying parts and the treatment necessary for the proper sterilization is destructive to some of the operating parts. In the machine of the present invention, all of these objectionable features are entirely obviated by making the pneumatic engine independent of and separable from the milk-carrying parts without necessitating the removal or uncoupling of any part whatsoever in order that the engine may be separated from the parts it drives.

To remove the pneumatic engine the latter is simply lifted out of the pocket 8, and the pulsator pistons are carried out of their cylinders with it, this being permitted by the slots 13. The engine may then be wiped off and put away while the pulsator pistons are simply slipped off the pins 96, and these said pistons, as well as the cover 3 and parts fast thereon and other parts with which the milk comes in contact, may be thoroughly sterilized in any of the well known ways. In order to reassemble the parts, it is only necessary to slip the pistons 14 on the pins 96 and then place these pistons in the cylinders 9 and the engine cylinder or casing 34 into the pocket 8.

It is further observed that the valve structure of the engine is entirely inclosed within the engine structure out of sight and reach of operatives so that the more delicate parts of the engine cannot be tampered with maliciously or thoughtlessly.

The operation of the device is entirely automatic and the oscillating valve is wholly controlled by the piston of the engine. The valve can only move when the piston has completed its stroke in either direction since the ports leading to it remain closed until the piston stroke is completed. The piston is in turn entirely controlled by the valve, although the ports operating the piston are at all times in register with both the initial pressure and exhaust ports, while the inner ports located in the post or standard are the ports which are controlled by the oscillating valve to properly control the outside inlet and exhaust ports. In order to reach the oscillating valve for any purpose, the plug 44 is readily accessible so that the corresponding end of the post or standard 39 may be opened and the oscillating valve will then drop out. The engine could not be readily sterilized without taking it all apart, and this would mean considerable work, but since the milk does not come in contact with it and the engine itself is not interposed in any part in the path of the milk and there is no danger of any matter which may be on the engine getting into the milk, sterilization is not necessary, and since the engine is so readily removable from the milk-carrying parts there is no reason for either attempting to sterilize the engine or for attempting to excuse neglect to sterilize the milk-carrying parts because of the difficulty of access to the several parts of the engine.

From the foregoing, it will be seen that the machine constituting the subject-matter of the present invention is advantageous because of its simple nature and freedom from danger of damage from meddlesome operators; also because the proper cleansing of the machine is greatly facilitated and, therefore, it may be kept in a strictly sanitary condition; also because the same vacuum producing mechanism necessary for the milking operations is utilizable for the operation of the pneumatic engine without bringing the air used for the propulsion of the engine into contact with the milk and also in the provision for regulating the speed of the engine and the influx of air for the periodic reduction of the vacuum in the milking operation.

It has been hereinbefore stated that if the vacuum reducing air port for the pulsator were made to operate at high speed, then too much air would be introduced when the machine was working at low speed. If the air port be made for the low speed, then when the speed is increased for milking cows giving the milk freely, the larger influx of air necessary to break the suction because of the rapid movement of the pulsator is not admitted and the vacuum in the conduit 20 is not relieved to a sufficient extent before the vacuum would again be established and thus very little if any pulsation would occur. However, this effect is entirely obviated by the adjustable air influx port of each pulsator piston.

What is claimed is:—

1. In a milking machine, a pulsator and support therefor, and a prime mover carried by the pulsator support and operatively connected to the pulsator without fastening devices whereby the prime mover may be readily moved from the pulsator and its support.

2. In a milking machine, a milk container, a cover therefor, a pulsator mechanism mounted on said cover, and a pneumatic engine adapted to be seated on said cover and operatively connected to the pulsator without fastening devices whereby the engine is readily removable from the cover and connection to the pulsator.

3. In a milking machine, a milk container, a cover therefor, a pulsator carried by the cover, a pocket formed in the cover adjacent to the pulsator, and a pneumatic engine adapted to be seated in the pocket and when so seated to be in operative relation to the pulsator but readily removable from both the pulsator and cover.

4. In a milking machine, a milking mechanism, a pneumatic engine for actuating the moving parts of the milking mechanism, and a common air exhausting means separately coupled to the milking mechanism and to the exhaust side of the engine, whereby the engine is operated by air and atmospheric pressure and the air so used is prevented from reaching the milk.

5. In a milking machine, the pulsator acting under reduced air pressure, a milk container for receiving milk passing through the pulsator, means for exhausting the air from the milk container, a pneumatic engine in operative relation to the pulsator, and connections between the exhaust side of the engine and the exhaust side of the milk container for operating the engine by normal air pressure and for conducting the air so used away from the milk container without passing through the latter.

6. In a milking machine, a milk container or receptacle, a cover for the same provided with a pocket on its upper surface, a pulsator mechanism carried by the cover, a pneumatic engine seated in the pocket and operatively connected to the pulsator, and a common air exhaust connection separately coupled with the milk container and to the exhaust side of the engine whereby the engine is operated by air at atmospheric pressure, and the air so used is directed away from the milk container.

7. In a milking machine, a pulsator of the vacuum type having a normally open air inlet relief port with a perforated diaphragm or screen covering the same exterior thereto, the perforations in the diaphragm being out of line with the return flow of fluid through the port, and an unyielding valve for said port adjustable at will.

8. In a milking machine, a pulsator of the vacuum type, having a constantly open air inlet port, means for varying the effective size of said air inlet port, and a cup exterior to said port and in communication therewith, said cup carrying a perforated diaphragm or screen in the path of the air stream, with the perforations out of line with the return flow of fluid through said port.

9. In a milking machine, a pulsator of the vacuum type having a normally open air inlet relief port and a perforated diaphragm or screen covering the same exterior thereto, the perforations in the diaphragm being out of line with the return flow of fluid through the port.

10. In a milking machine, a pulsator of the vacuum type having a constantly open air inlet port, and a cup exterior to said port and in communication therewith, said cup carrying a perforated diaphragm or screen in the path of the air stream, with the perforations out of line with the return flow of fluid through said port.

11. In a milking machine, a pulsator of the vacuum type provided with an air inlet port, an unyielding valve for said port adjustable at will, and a carrier for said valve constituting a chamber of larger area than the port and provided with a perforated diaphragm or screen exterior to the valve seat and having the perforations out of line with the return flow of fluid through the port.

12. In a milking machine, a pulsator comprising a reciprocating piston, a bridging port therein, a milk conduit provided with a port adapted to be opened and closed by the piston, and an air inlet port so located as to be put into communication with the milk conduit port in one phase of the operation of the piston, said inlet port having an unyielding, adjustable valve.

13. In a milking machine of the vacuum type, a suitable pulsator and means for operating said pulsator comprising a pneumatic engine provided with a reciprocating piston, and a slide valve chest and slide valve interior to the piston, said slide valve being actuated to its operative positions by the air pressure utilized to drive the piston.

14. In a milking machine of the vacuum type, a suitable pulsator, and a pneumatic engine for operating the pulsator comprising an outer cylinder or casing, a piston interior thereto, a guide for the piston concentric therewith and constituting a valve chamber, and a reciprocatory valve member contained in the valve casing, the said cylinder piston and valve casing being provided with suitable ports for the admission of air.

15. In a milking machine, a suitable pulsator and a pneumatic engine for operating the same comprising a cylinder or casing, a central hollow post or standard therein and provided with suitable ports, a piston between the standard and cylinder and also provided with suitable ports, a valve member within the post or standard, and means for permitting the removal of the valve member without dismantling the engine.

In testimony that I claim the foregoing as my own, I have hereto affixed my signature in the presence of two witnesses.

DANIEL KLEIN.

Witnesses:
A. C. WELD,
C. W. GOLDEN.